C. F. RYLAND.
MAGNETIC COMPASS.
APPLICATION FILED APR. 10, 1918.

1,273,411.

Patented July 23, 1918.

Inventor:-
Charles Frederick Ryland.
By:- B. Singer. Atty.

UNITED STATES PATENT OFFICE.

CHARLES F. RYLAND, OF ALDERSHOT, ENGLAND.

MAGNETIC COMPASS.

1,273,411.  Specification of Letters Patent.  Patented July 23, 1918.

Application filed April 10, 1918. Serial No. 227,710.

*To all whom it may concern:*

Be it known that I, CHARLES FREDERICK RYLAND, a subject of the King of England, residing at 109 St. Michael's road, Aldershot, Hampshire, England, (whose post-office address is 109 St. Michael's Road, Aldershot, Hampshire, England,) have invented certain new and useful Improvements in Magnetic Compasses, of which the following is a specification.

My invention relates to pocket or portable magnetic compasses which have a reflecting mirror fitted in the line of sight as described in the specification of my United States Patent No. 1,254,361. In that type it has been proposed to mount a reflector independently of the hinged lid in such a manner that the lid could be closed without removing the reflector fitting, and in such position that the observer could read by reflection the numerals at the farther side of the dial.

According to the present invention, I place the mirror above the fixed or rotatable glass cover of the compass and in such a position as to be between the center of the dial and the circle of numerals upon the dial toward the observer, so that the observer can read the dial at the point nearest to him.

Accordingly the numerals on the dial are the same as in a prismatic compass, that is to say, each differs in value by 180 degrees from its true value, and they are so disposed that their images in the mirror appear upright, and in correct form for reading exactly as in the ordinary prismatic compass, the action of which is simulated by my new arrangement.

When magnification is required, I prefer to use a concave reflector, such a reflector so placed over a flat dial would cause the degrees to diverge when seen in the mirror; to obviate this, I prefer to turn the edge of the dial up at an outward angle of approximately 45 degrees, which has the effect of making the degrees appear parallel in the mirror or what is termed a flat field.

The mirror is secured to any suitable part of the compass body or the glass cover thereof and is suitably hinged for folding, thereby allowing the hinged lid of the compass case to be closed without detaching the mirror from the compass.

The accompanying drawings will illustrate my invention.

Figure 1:
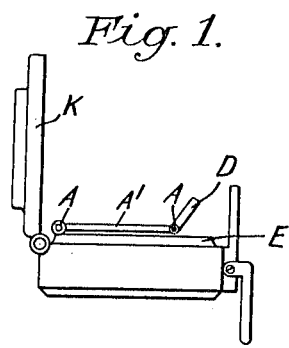
Figure 1 is a side elevation of a compass with a reflector D attached by two hinges A and the arm A' to the rotatable glass cover or mount E usually fitted to compasses of this description; the reflector D being hinged to the arm A', which in its turn is hinged to the mount E. K shows the hinged lid or cover usually fitted to compasses of this description.
Figure 2:
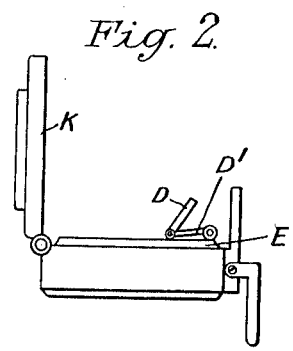
Fig. 2 shows the manner in which a reflector mounting may be fixed on the diametrically opposite side of the compass to that shown in Fig. 1. The reflector D is here also hinged to the mount E and a sight hole is cut in the arm D' to permit of the numerals on the dial being reflected through the aperture L, see Fig. 3.
Figure 3:
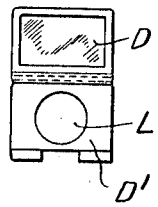
Fig. 3 is a detached view of the mirror shown in Fig. 2.
Figure 4:
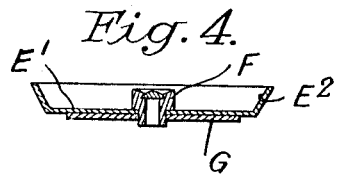
Fig. 4 shows the dial E' with up-turned edge E², and the magnetic needle marked G, the latter being screwed to the jewel mount F.

In the drawings the reflector D is shown attached to the mount E, but it is obvious that the reflector may be held in similar positions to those described, by fittings which are suitably fixed to any part of the body of the compass, for example, should the prism of a prismatic compass be lost or broken, a reflecting mirror may be substituted.

It is also clear that my reflecting mirror may be used in similar positions with compasses which are fitted with ordinary flat dials.

The reflecting mirror may be made in glass or metal, and may be made either flat, concave or convex, and provided with or without, a sight line, or notch, slot or hole. The reflector may also be provided with a stop piece, which will enable the mirror to be adjusted to the correct angle for reading when required for use.

I am aware that it has already been proposed to provide an ordinary open faced compass with a hinged reflector situated at the point of the dial nearest to the observer so that the numerals reflected from a prismatic compass dial can be read. My invention differs therefrom in being adjustably mounted on the case body of a pocket compass provided with a caplike lid which can be closed down without removing the reflector.

I am also aware that it has been proposed to provide a pocket compass with a reflecting mirror fixed to the inside surface of the hinged lid. By my invention the reflector is adjustable independently of the hinged lid which latter can be used in the usual way for sighting through the ordinary sight aperture therein.

Having fully described my invention, what I claim and desire to secure by Letters Patent is:—

A magnetic compass comprising a casing; a lid or cover-part hinged to the said casing; a compass needle mounted in said casing; a dial secured to said needle and having reversed and advanced numerals circumferentially marked thereon, a reflecting mirror hingedly mounted on the casing above the dial and between its center and the numerals on its circumference so that the reading can be taken at the edge of the dial nearest to the observer, and the lid or cover can be closed down without detaching the mirror.

In testimony whereof I have hereunto set my hand, in presence of two suscribing witnesses, this 25th day of March, 1918.

CHARLES F. RYLAND.

Witnesses:
F. D. GOLBY,
R. L. GOLBY.

Copies of this patent may be obtained for five cents each, by addressing the "Commissioner of Patents, Washington, D. C."